(12) United States Patent
Claiborn et al.

(10) Patent No.: US 8,725,512 B2
(45) Date of Patent: May 13, 2014

(54) METHOD AND SYSTEM HAVING HYPOTHESIS TYPE VARIABLE THRESHOLDS

(75) Inventors: David Claiborn, Edina, MN (US);
Vaibhava Goel, Elmsford, NY (US);
Ramesh Gopinath, Millwood, NY (US);
Pichappan Pethachi, Tampa, FL (US)

(73) Assignee: Nuance Communications, Inc., Burlington, MA (US)

(*) Notice: Subject to any disclaimer, the term of this patent is extended or adjusted under 35 U.S.C. 154(b) by 1704 days.

(21) Appl. No.: 11/685,328

(22) Filed: Mar. 13, 2007

(65) Prior Publication Data

US 2008/0228486 A1 Sep. 18, 2008

(51) Int. Cl.
*G10L 15/22* (2006.01)

(52) U.S. Cl.
CPC ........................ *G10L 15/22* (2013.01)
USPC .................. 704/270; 704/270.1; 704/275

(58) Field of Classification Search
CPC ..................................... G10L 15/22
USPC ............................. 704/270, 270.1, 275
See application file for complete search history.

(56) References Cited

U.S. PATENT DOCUMENTS

| | | | | |
|---|---|---|---|---|
| 5,365,574 A | * | 11/1994 | Hunt et al. | 379/88.02 |
| 5,671,330 A | * | 9/1997 | Sakamoto et al. | 704/268 |
| 5,895,447 A | * | 4/1999 | Ittycheriah et al. | 704/231 |
| 5,960,393 A | * | 9/1999 | Cohrs et al. | 704/240 |
| 7,139,717 B1 | * | 11/2006 | Abella et al. | 704/275 |
| 2002/0055844 A1 | * | 5/2002 | L'Esperance et al. | 704/260 |
| 2003/0130849 A1 | * | 7/2003 | Durston et al. | 704/270 |
| 2003/0167170 A1 | * | 9/2003 | Andrsen et al. | 704/270 |
| 2004/0024601 A1 | * | 2/2004 | Gopinath et al. | 704/270 |
| 2004/0073431 A1 | * | 4/2004 | Galanes et al. | 704/270.1 |
| 2004/0249637 A1 | * | 12/2004 | Baker | 704/239 |
| 2005/0080627 A1 | * | 4/2005 | Hennebert et al. | 704/270 |
| 2006/0004574 A1 | * | 1/2006 | Ju | 704/257 |
| 2006/0149544 A1 | * | 7/2006 | Hakkani-Tur et al. | 704/236 |
| 2006/0293886 A1 | * | 12/2006 | Odell et al. | 704/231 |
| 2007/0162281 A1 | * | 7/2007 | Saitoh et al. | 704/251 |
| 2007/0233497 A1 | * | 10/2007 | Paek et al. | 704/270 |

OTHER PUBLICATIONS

Jouvet et al. "Hypothesis Dependent Threshold Setting for Improved Out-of-Vocabulary Data Rejection", IEEE ICASSP 1999.*

Sunil K. Gupta, et al., "Improved Utterance Rejection Using Length Dependent Thresholds", Bell Laboratories-Lucent Technologies, New Jersey, USA, pp. 1-4, Published: 1998.

Christine Pao, et al., "Confidence Scoring for Speech Understanding Systems", Spoken Language Systems Group Laboratory for Computer Science, Massachusetts Institute of Technology, Cambridge, Massachusetts, USA, pp. 1-4, Pub. date: 1998.

\* cited by examiner

*Primary Examiner* — Jialong He
(74) *Attorney, Agent, or Firm* — Wolf, Greenfield & Sacks, P.C.

(57) ABSTRACT

A method (and system) for spoken dialog confirmation classifies a plurality of spoken dialog hypotheses, and assigns a threshold to each class of spoken dialog hypotheses.

21 Claims, 4 Drawing Sheets

METHOD AND SYSTEM HAVING HYPOTHESIS TYPE VARIABLE THRESHOLDS

BACKGROUND OF THE INVENTION

1. Field of the Invention

The present invention generally relates to a method and system for accepting or rejecting a spoken dialog hypothesis. More particularly, the present invention relates to a method and system for determining acceptance of a spoken dialog hypothesis by comparing a confidence level to a threshold that is based upon the type of hypothesis.

2. Description of the Related Art

Spoken dialog systems need to determine whether to accept or reject a hypothesis. For example, a spoken dialog system may receive a sound signal representing the voice of a user of the system and the system may then compare the input signal to potential candidates. The system would determine a hypothesis by, for example, selecting a candidate from a list of candidates that has the highest confidence indicator. However, these systems need to determine whether the confidence indicator is high enough such that the system should accept the hypothesis as being correct. It is undesirable to automatically accept a hypothesis merely because it has the highest confidence of all potential candidates because the candidate with the highest confidence level may have a relatively low confidence level. These conventional systems address this problem by comparing the confidence level of a hypothesis to a predetermined threshold. If the confidence level exceeds the predetermined threshold, then the hypothesis is accepted. If the confidence level does not exceed the predetermined threshold, then the hypothesis is rejected. In this manner, conventional systems attempt to avoid making wrong decisions.

Some conventional systems attempt to further reduce the chance of an incorrect acceptance by providing two different thresholds. These systems incorporate a rejection threshold and a confirmation threshold. The rejection threshold is always lower than the confirmation threshold. Any hypothesis having a confidence level below the rejection threshold is rejected. Any hypothesis having a confidence level above the rejection threshold, but below the confirmation threshold requires that the user confirm whether the hypothesis is correct before the hypothesis is accepted by the system. Any hypothesis having a confidence level above the confirmation threshold is accepted without confirmation.

One conventional system derives features about a hypothesis from a recognizer and a parser and then classifies these features to determine whether to accept or reject the hypothesis. This system is concerned more with efficient operation rather than achieving the correct result.

Another conventional system adjusts acceptance thresholds based upon the length of the input audio. Since this system only considers the duration of the input audio, the system does not rely upon any hypothesized information at all to make a threshold determination.

SUMMARY OF THE INVENTION

In view of the foregoing and other exemplary problems, drawbacks, and disadvantages of the conventional methods and structures, an exemplary feature of the present invention is to provide a method and structure in which a spoken dialog system classifies a plurality of hypotheses and assigns a threshold to each class of hypothesis.

In a first exemplary aspect of the present invention, a method for spoken dialog confirmation includes classifying a plurality of spoken dialog hypotheses into a plurality of classes of spoken dialog hypotheses, and assigning a threshold to each of the classes of spoken dialog hypotheses.

In a second exemplary aspect of the present invention, a system for spoken dialog confirmation includes a spoken dialog hypothesis classifier that classifies a plurality of spoken dialog hypotheses into a plurality of classes of spoken dialog hypotheses, and a threshold assigner that assigns a threshold to each of the classes of spoken dialog hypotheses.

In a third exemplary aspect of the present invention, a system for spoken dialog confirmation includes means for classifying a plurality of spoken dialog hypotheses into a plurality of classes of spoken dialog hypotheses, and means for assigning a threshold to each of the classes of spoken dialog hypotheses.

An exemplary embodiment of the present invention uses different rejection and confirmation thresholds for different user inputs by making these thresholds a function of user utterance and semantic interpretation.

An exemplary embodiment of the present invention determines thresholds based upon a hypothesis typing at a word level. This word level hypothesis and semantic interpretation makes it quite easy to implement into existing dialog systems.

An exemplary embodiment of the present invention includes a threshold that is based upon a type or class of hypothesis. A type of hypothesis is specified by a grouping of hypotheses. Given a set of hypotheses, any arbitrary partition of that set defines a set of types, where each cluster in that partition indicates a type.

An exemplary embodiment of the invention identifies an hypothesis within an input signal; and identifies a threshold based upon the type hypothesis A hypothesis is, in general, the set of pieces of information (including multiple word level transcriptions, their semantic interpretations, associated scores, and the like) that are generated when a recognition process is carried out on audio. In an exemplary embodiment of the present invention, only those results which are derived using semantic interpretation are used.

In an exemplary embodiment of the present invention, a joint optimization of clusters and thresholds is carried out and there are many possible ways in which this joint optimization may be approximated and achieved. An example of joint optimization is an iterative process that starts with some clustering of hypotheses, finds optimal thresholds for that clustering, then given those thresholds for clusters, determines if changing cluster membership of some hypotheses results in improved performance. Then, given this new clustering, finds optimal thresholds, and so forth. This process attempts to learn both the optimal clustering and optimal thresholds for the optimal clustering.

In an exemplary embodiment of the present invention, hypotheses may be typed based upon historically recorded frequencies. For example, an hypothesis having a higher frequency of occurrence in the past is more likely to occur again than another hypothesis having a lower frequency of occurrence. Thus, various hypotheses may be typed (classified) based upon these frequencies and the thresholds adjusted based upon the typing (classification).

Another exemplary embodiment may determine the type of a hypothesis based upon historical acceptance rate. For example, a system may continuously record the number of false accepts or false rejects for a set of hypotheses and group (type) these hypotheses based upon the historical data. Those hypotheses having a higher false acceptance rate may be provided with a higher acceptance threshold than those hypotheses having a lower false acceptance rate.

In an exemplary embodiment of the present invention, the hypothesis are grouped based upon an historical frequency of occurrence. For example, those hypotheses having a high historical frequency may be provided with a lower threshold, while those hypotheses having a lower historical frequency may be provided with a higher threshold.

In another exemplary embodiment of the present invention, each individual hypothesis may have a threshold assigned to it individually.

In yet another exemplary embodiment of the present invention, the hypotheses may be grouped based upon a difficulty of recognition. For example, those hypotheses having a low difficulty of recognition may be provided with a lower threshold, while those hypotheses having a higher difficulty of recognition may be provided with a higher threshold.

These and many other advantages may be achieved with the present invention.

BRIEF DESCRIPTION OF THE DRAWINGS

The foregoing and other exemplary purposes, aspects and advantages will be better understood from the following detailed description of an exemplary embodiment of the invention with reference to the drawings, in which.

DETAILED DESCRIPTION OF EXEMPLARY EMBODIMENTS OF THE INVENTION

Referring now to the drawings, and more particularly to FIGS. 1-4, there are shown exemplary embodiments of the method and structures of the present invention.

Figure 1:
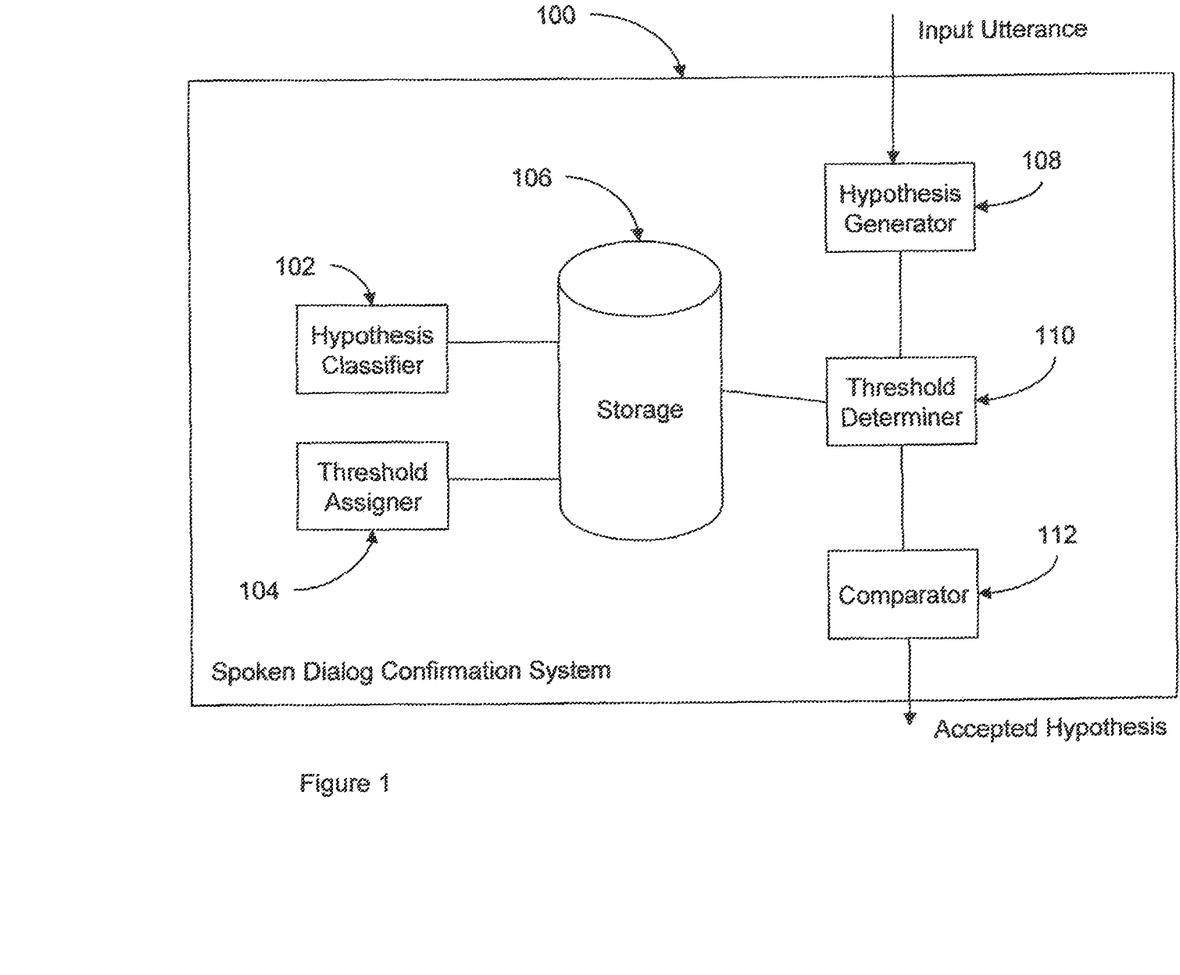
FIG. 1 illustrates an exemplary spoken dialog confirmation system 100 in accordance with the present invention.

FIG. 1 illustrates an exemplary spoken dialog confirmation system 100 in accordance with the present invention. The spoken dialog confirmation system 100 includes a hypothesis classifier 102, a threshold assigner 104, a storage 106, an hypothesis generator 108, a threshold determiner 110, and a comparator 112. The hypothesis classifier 102 classifies a plurality of hypotheses that are stored in the storage 106. For example, the classifier 102 may classify the hypotheses according to the frequency of occurrence.

Based upon the classification assigned by the hypothesis classifier 102, the threshold assigner 104 assigns a threshold to each hypothesis and then stores the corresponding thresholds in the storage 106.

The hypothesis generator 108 receives an input utterance (i.e. a spoken dialog) and generates a hypothesis based upon the input utterance. The method for determining a hypothesis may be performed according to standard semantic interpretation methods. These methods also provide a confidence indicator that indicates the degree of confidence with which the system believes the hypothesis is likely to correspond correctly to the input utterance.

The threshold determiner 110 receives the generated hypothesis along with the confidence indicator and determines a corresponding threshold value in accordance with the previously assigned thresholds stored in the storage 106 as assigned by the threshold assigner 104. The threshold determiner 110 assigns the corresponding threshold to the generated hypothesis.

The comparator 112 compares the confidence indicator value against the threshold value that is provided by the threshold determiner 110. If the confidence indicator exceeds the threshold, then the comparator 112 outputs the hypothesis as an accepted hypothesis.

Figure 2:
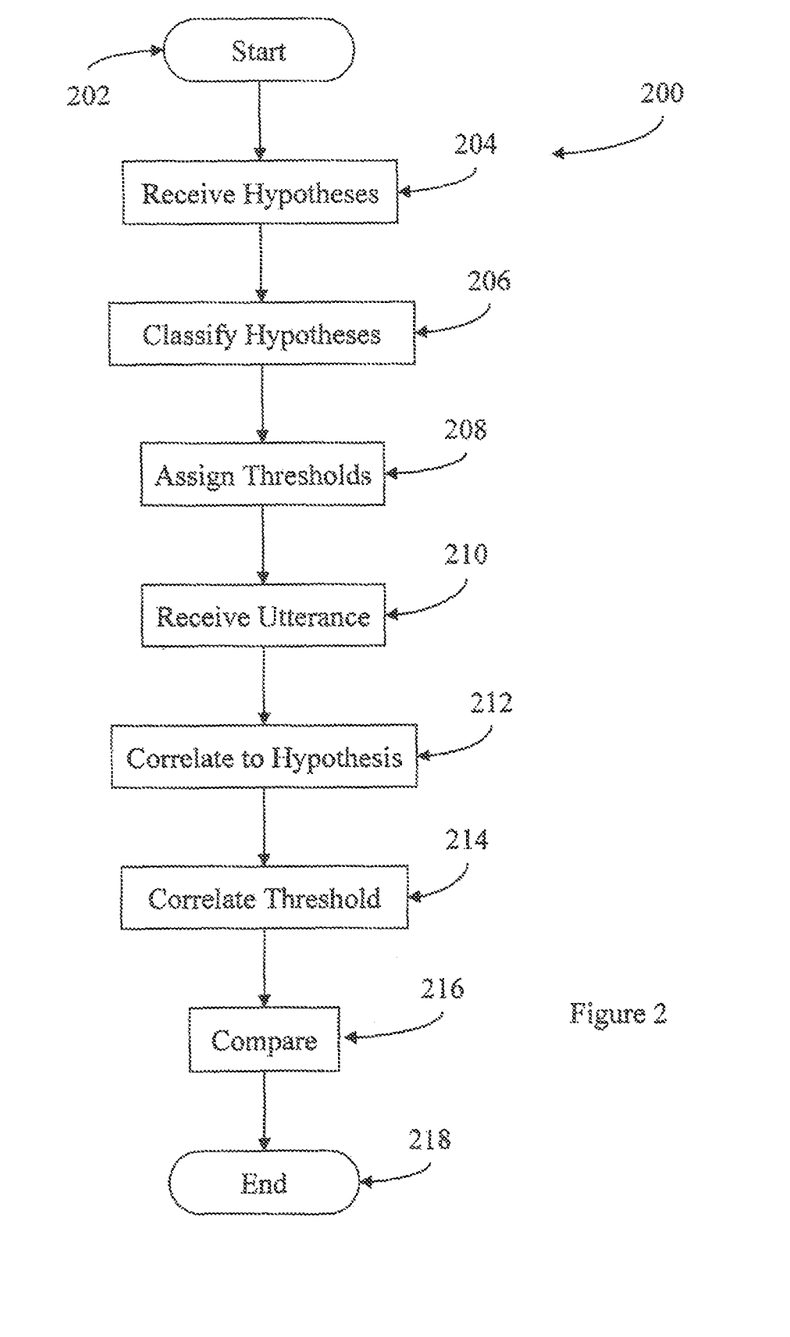
FIG. 2 is a flowchart 200 of an exemplary method of spoken dialog confirmation in accordance with the present invention.

FIG. 2 is a flowchart 200 of an exemplary method for spoken dialog confirmation in accordance with the present invention. The flowchart 200 starts at step 202 and continues to step 204. In step 204, the method receives a set of hypotheses and continues to step 206. In step 206, the method classifies the hypotheses according to, for example, the frequency of occurrence. Next, the method assigns a threshold to each classification of hypotheses and continues to step 210.

In step 210, the method receives an utterance as input and continues to step 212. In step 212, the method correlates the utterance to an hypothesis and provides a confidence indicator for the hypothesis. In step 214, the method correlates a threshold to the hypothesis according to the classification of the hypothesis in step 206. Next, the method compares the confidence indicator to the threshold and, if the confidence indicator exceeds the threshold, outputs the hypothesis as an accepted hypothesis. The method ends at step 218.

The inventors compared an exemplary embodiment of the present invention to two conventional systems which use different dialog states—one that uses a rejection and a confirmation threshold, and one that only uses rejection threshold. The experiments were conducted by the inventors using data that was collected from usage of these states by real callers (results presented below). The experimental results show that the present invention achieves significant reductions in unnecessary confirmations (confirming when recognized target is correct) and in false accepts and false rejects.

The first dialog state, called "Main-Menu," provides an open-ended prompt and uses a statistical language model for recognition and a statistical classer for finding semantic interpretation. The baseline (current) implementation of this state uses two hypothesis independent thresholds; one for rejection and one for confirmation. These threshold values are shown in Table 1. Using these thresholds, the rejection or confirmation is determined as follows: If the actual confidence score is less than the rejection threshold, then the hypothesis is rejected. If the confidence score is equal to or above the rejection threshold but equal to or below the confirmation threshold, then the hypothesis is confirmed, and if the confidence is above the confirmation threshold, then the hypothesis is accepted. If the confirmation threshold value is smaller then a rejection threshold for a target, then that hypothesis is rejected.

Table 1 illustrates thresholds of a conventional spoken dialog system. The rejection threshold is the same for all possible hypothesis. The confirmation threshold is also the same for all hypothesis. However, the confirmation threshold is only applied to a subset of hypotheses.

TABLE 1

| Hypothesis | Rejection threshold | Confirmation threshold |
| --- | --- | --- |
| HandsetRelated_General | 30 | None |
| Universals_WAMC | 30 | None |
| Universals_Operator | 30 | None |
| Universals_Goodbye | 30 | None |
| AccountRelated_MinutesUsed | 30 | 51 |
| ServiceProblems_DroppedCalls | 30 | 51 |

TABLE 1-continued

| Hypothesis | Rejection threshold | Confirmation threshold |
|---|---|---|
| PayNow_General | 30 | 51 |
| _rest_ | 30 | 51 |

The inventors applied this conventional system to a data set and collected results provided by the conventional system. The results found that 95.7% of the hypotheses were recognizable as being within the vocabulary of the system (i.e. being within the grammar). For these, "in grammar" hypotheses, the conventional system provided a correct acceptance rate of 77.3%, a false acceptance rate of 2.6%, a false confirmation rate of 12.3%, and a false rejection rate of 3.5%. The conventional system also had 4.3% outside of the vocabulary (i.e. out-of-grammar) that had a correct reject rate of 2.8%, a 0.7% false acceptance rate, and a 0.8% false confirmation rate. Thus, the conventional system had an overall failure rate of 19.9%.

The specific false rejection/confirmation/acceptance numbers on some of these hypotheses are illustrated in Table 2 below:

TABLE 2

| Hypothesis | Spoken (count) | Correct accept | False accept | False confirm | False reject |
|---|---|---|---|---|---|
| AccountRelated_MinutesUsed | 641 | 350 | 12 | 227 | 52 |
| PayNow_General | 536 | 338 | 31 | 150 | 17 |
| ServiceProblems_DroppedCalls | 416 | 315 | 11 | 67 | 23 |

The inventors applied an exemplary embodiment of the present invention having a constraint optimization (on some training data separate from the test data) to keep the total false-accepts to below 3.45% and total rejects (correct rejects+false rejects) below 7.5%. Constraint optimization is carried out by placing constraints on maximum permissible false accepts, false rejects, and false confirms, minimum permissible correct accepts and correct rejects, or some combination of these. The optimization process attempts to minimize the total false accepts, confirms, and rejects while making sure that the constraints are not violated.

The inventors obtained the following results using the following thresholds in accordance with an exemplary embodiment of the present invention:

TABLE 3

| Hypothesis | Rejection threshold | Confirmation threshold |
|---|---|---|
| HandsetRelated_General | 38 | None |
| Universals_WAMC | 28 | None |
| Universals_Operator | 28 | None |
| Universals_Goodbye | 28 | None |
| AccountRelated_MinutesUsed | 30 | 36 |
| ServiceProblems_DroppedCalls | 30 | 46 |
| PayNow_General | 30 | 45 |
| _rest_ | 30 | 51 |

Note that the rejection thresholds and the confirmation thresholds change depending upon the hypothesis. With these rejection and confirmation threshold values, the exemplary embodiment obtained the following results. The in-grammar percentage rate was 95.7%, the correct acceptance rate was 81.4%, the false acceptance rate was 2.6%, the false confirmation rate was 8.2%, and the false rejection rate was 3.5%. The out-of-grammar rate was 4.3%, the correct reject rate was 2.9%, the false acceptance rate 0.7%, and the false confirmation rate was 0.7%. Thus, the overall failure rate was 15.7%. This is a significant improvement over the 19.9% failure rate of the conventional system and method.

Comparing with the baseline numbers, there is a large drop in total false acceptance/confirmation/rejection. This drop is largely due to drop in false confirmation—which means that the recognizer had correctly recognized the target but it was still getting confirmed due to poor threshold settings.

With these new values, the false accept/confirm/reject numbers on some of these hypotheses are illustrated in Table 4 below:

TABLE 4

| Hypothesis | Spoken (count) | Correct accept | False accept | False confirm | False reject |
|---|---|---|---|---|---|
| AccountRelated_MinutesUsed | 641 | 547 | 12 | 30 | 52 |
| PayNow_General | 536 | 399 | 32 | 32 | 17 |
| ServiceProblems_DroppedCalls | 416 | 336 | 10 | 46 | 24 |

Comparing the numbers in Table 4 with those of Table 2, with new, hypothesis type dependent thresholds, a large drop in false confirmations is achieved and the correct accept rate is much higher. Furthermore, these improvements come without an impact on false-accepts and rejects.

The inventors also examined the application of a conventional system and an exemplary embodiment of the present invention upon test data called BackOffMainMenu. This application does not carry out confirmation and hence has only one rejection threshold in the baseline (current) system. Table 5 illustrates the conventional system having the same rejection threshold regardless of the type of Hypothesis.

TABLE 5

| Hypothesis | Rejection threshold |
|---|---|
| Help_me_with_something_else | 39 |
| Operator | 39 |
| My_bill, My_plan | 39 |
| _rest_ | 39 |

With these threshold settings, using the conventional system resulted in an in-grammar rate of 79.9% with a correct acceptance rate of 71.2%, a false acceptance rate of 2.1%, and a false rejection rate of 6.6%. For the out-of-grammar rate of 20.1%, the result was a correct reject rate of 11.3%, and a false acceptance rate of 8.9%. This results in an overall failure rate of 17.6%.

The false accept/reject rates on some frequent targets are illustrated in Table 6 below:

TABLE 6

| Hypothesis | Spoken (count) | Correct accept | False accept | False reject |
|---|---|---|---|---|
| Help_me_with_something_else | 915 | 737 | 45 | 133 |
| Operator | 686 | 674 | 1 | 11 |
| My_bill | 331 | 308 | 2 | 21 |
| My_plan | 295 | 270 | 9 | 16 |

After constraint optimization, an exemplary embodiment of the present invention having the rejection thresholds for different hypotheses was applied to the test data. For example, the rejection thresholds are illustrated by Table 7 below:

TABLE 7

| Hypothesis | Rejection threshold |
|---|---|
| Help_me_with_something_else | 29 |
| Operator | 39 |
| My_bill, My_plan | 39 |
| _rest_ | 46 |

The exemplary embodiment of the present invention provided an in-grammar rate of 79.9% having a correct acceptance rate of 73.4%, a false acceptance rate of 1.9%, and a false rejection rate of 4.6%, an out-of-grammar rate of 20.1% having a correct rejection rate of 12.5%, and a false acceptance rate of 7.7%. This results in an overall failure rate of 14.2%, which is significantly lower than the 17.6% failure rate of the conventional system and method.

Exemplary false accept/rejects on some frequent hypotheses in the test data applied to the exemplary embodiment are illustrated in Table 8 below:

TABLE 8

| Hypothesis | Spoken (count) | Correct accept | False accept | False reject |
|---|---|---|---|---|
| Help_me_with_something_else | 915 | 818 | 40 | 57 |
| Operator | 686 | 674 | 0 | 12 |
| My_bill | 331 | 308 | 2 | 21 |
| My_plan | 295 | 270 | 8 | 17 |

Similar to the Main-Menu results described earlier, for this state also there is a large overall improvement. There is a large gain in the correct accepts of the most frequent hypothesis and practically no change for others.

Figure 3:
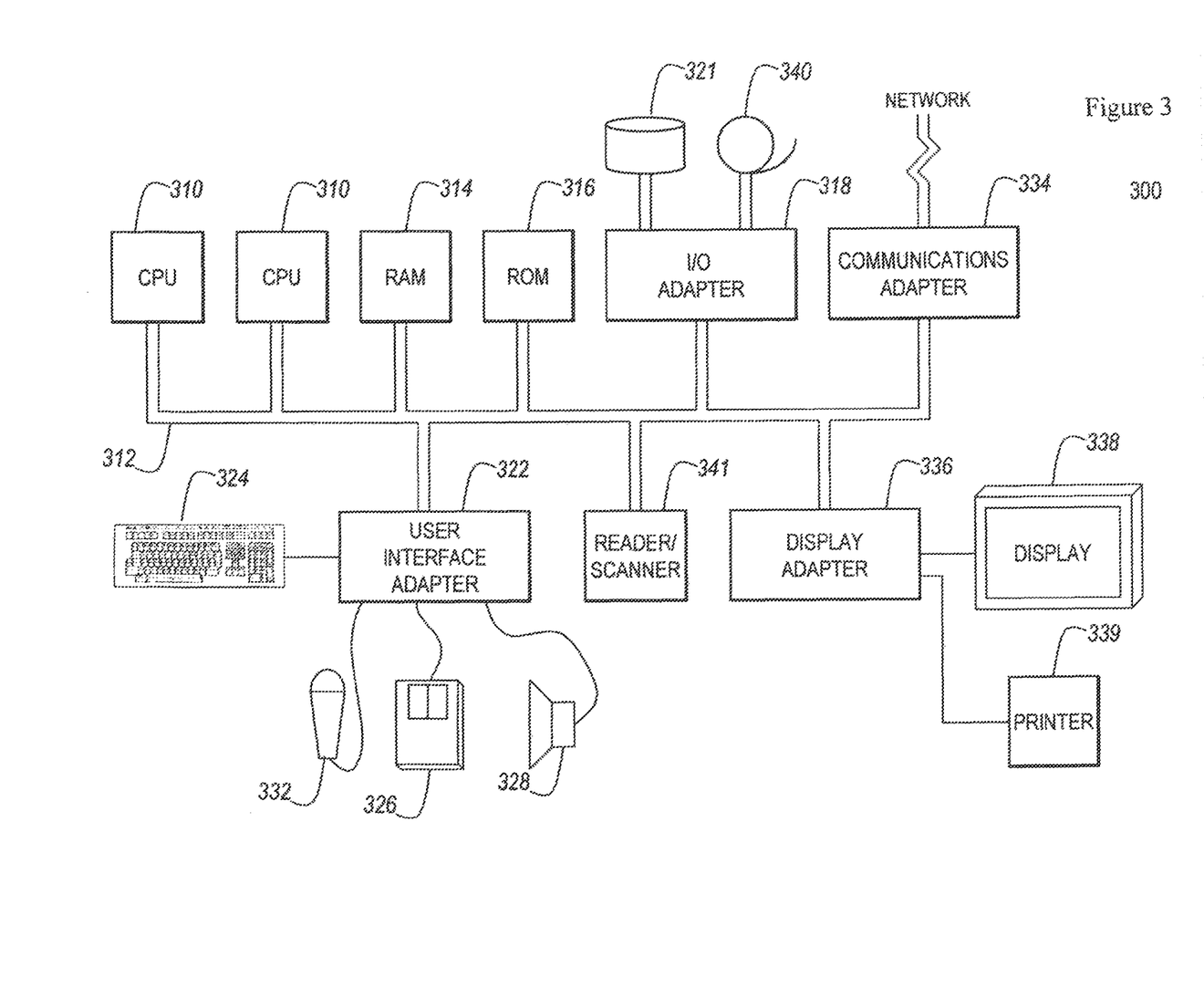
FIG. 3 illustrates a typical hardware configuration 300 which may be used for implementing the inventive system and method for spoken dialog confirmation.
Figure 4:
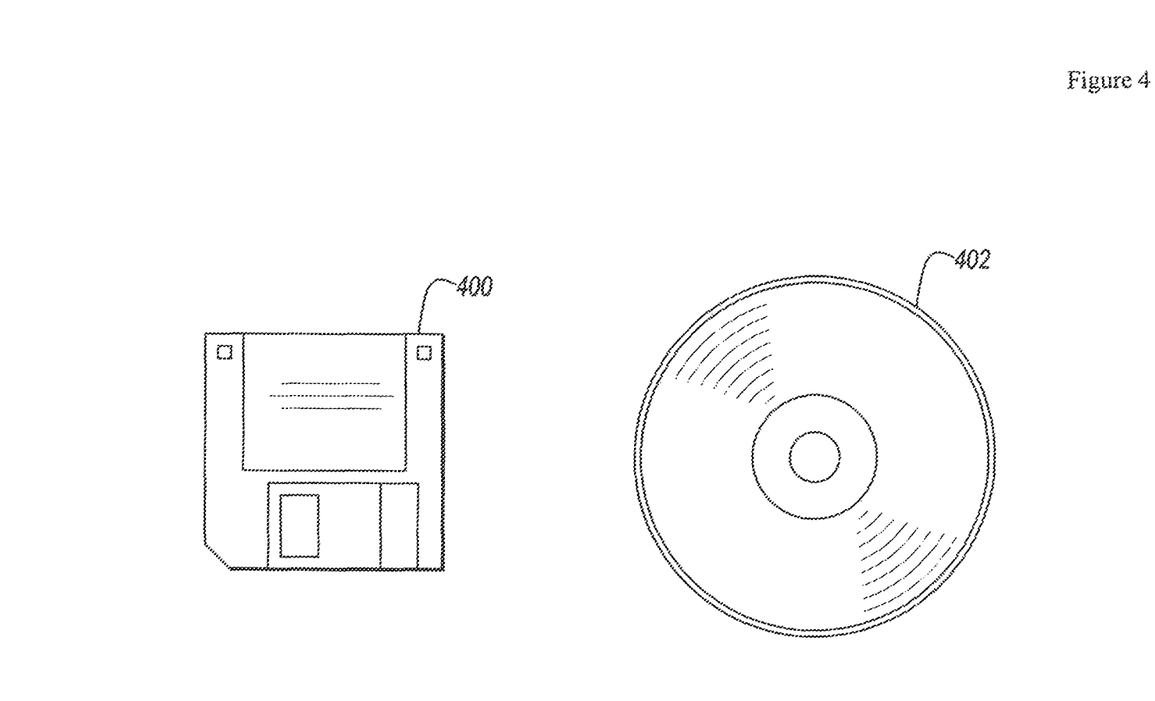
FIG. 4 illustrates exemplary signal bearing media 400 for storing instructions for a spoken dialog system in accordance with the present invention.

Referring now to FIG. 3, system 300 illustrates a typical hardware configuration which may be used for implementing the inventive system and method for spoken dialog confirmation. The configuration has preferably at least one processor or central processing unit (CPU) 310. The CPUs 302 are interconnected via a system bus 312 to a random access memory (RAM) 314, read-only memory (ROM) 316, input/output (I/O) adapter 318 (for connecting peripheral devices such as disk units 321 and tape drives 340 to the bus 312), user interface adapter 322 (for connecting a keyboard 324, mouse 326, speaker 328, microphone 332, and/or other user interface device to the bus 312), a communication adapter 334 for connecting an information handling system to a data processing network, the Internet, and Intranet, a personal area network (PAN), etc., and a display adapter 336 for connecting the bus 312 to a display device 338 and/or printer 339. Further, an automated reader/scanner 341 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the present invention is directed to a programmed product, including signal-bearing media tangibly embodying a program of machine-readable instructions executable by a digital data processor to perform the above method.

Such a method may be implemented, for example, by operating the CPU 310 to execute a sequence of machine-readable instructions. These instructions may reside in various types of signal bearing media.

Thus, this aspect of the present invention is directed to a programmed product, comprising signal-bearing media tangibly embodying a program of machine-readable instructions executable by a digital data processor incorporating the CPU 310 and hardware above, to perform the method of the invention.

This signal-bearing media may include, for example, a RAM contained within the CPU 310, as represented by the fast-access storage for example. Alternatively, the instructions may be contained in another signal-bearing media, such as a magnetic data storage diskette 400 or CD-ROM 402, (FIG. 4), directly or indirectly accessible by the CPU 310.

Whether contained in the computer server/CPU 310, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable signal-bearing media. In an illustrative embodiment of the invention, the machine-readable instructions may comprise software object code, complied from a language such as "C," etc.

While the invention has been described in terms of several exemplary embodiments, those skilled in the art will recognize that the invention can be practiced with modification.

Further, it is noted that, Applicants' intent is to encompass equivalents of all claim elements, even if amended later during prosecution.

What is claimed is:

1. A method of configuring a system to perform spoken dialog confirmation, comprising:
    operating at least one programmed processor to perform:
        classifying a plurality of spoken dialog hypotheses into a plurality of classes of spoken dialog hypotheses, each of the plurality of spoken dialog hypotheses being a potential semantic interpretation that a semantic interpreter is able to output as a result of a semantic interpretation process performed on an input, the plurality of classes comprising a first class of spoken dialog hypotheses comprising at least one first spoken dialog hypothesis and a second class of spoken dialog hypotheses comprising at least one second spoken dialog hypothesis, the at least one first spoken dialog hypothesis being different from the at least one second spoken dialog hypothesis; and
        determining, for each of said plurality of classes of spoken dialog hypotheses, a threshold for use in evaluating a confidence level of the semantic interpreter in an output of the semantic interpreter that comprises one of the one or more hypotheses in the class, wherein the determining comprises determining a first threshold for the first class and a second threshold for the second class, the first threshold having a different value than the second threshold, wherein the determining comprises adjusting the first threshold based at least in part on a number of times the at least one first spoken dialog hypothesis was previously output by the semantic interpreter.

2. The method of claim 1, further comprising operating the at least one programmed processor to perform acts of:
- receiving an utterance as an input;
- generating a spoken dialog hypothesis and a confidence value for said utterance;
- determining a corresponding threshold for said spoken dialog hypothesis based upon said classifying; and
- comparing said confidence value of said spoken dialog hypothesis to each threshold.

3. The method of claim 2, further comprising operating the at least one programmed processor to perform accepting said spoken dialog hypothesis if said confidence value exceeds said threshold.

4. The method of claim 2, further comprising operating the at least one programmed processor to perform rejecting said spoken dialog hypothesis if said confidence value does not exceed said threshold.

5. The method of claim 1, wherein said determining a threshold to each class comprises determining a confirmation threshold and a rejection threshold to each class, and
wherein the method further comprises operating the at least one programmed processor to recognize an utterance spoken by a user by:
- receiving the utterance as an input;
- generating a spoken dialog hypothesis and a confidence value for said utterance;
- determining corresponding rejection and confirmation thresholds for said spoken dialog hypothesis based upon said classifying;
- comparing said confidence value of said spoken dialog hypothesis to said thresholds;
- accepting said spoken dialog hypothesis if said confidence value exceeds said confirmation threshold;
- confirming said spoken dialog hypothesis if said confidence value does not exceed said confirmation threshold but exceeds said rejection threshold; and
- rejecting said spoken dialog hypothesis if said confidence value does not exceed said rejection threshold and said spoken dialog hypothesis is not confirmed.

6. The method of claim 1, wherein said spoken dialog hypotheses are classified according to a difficulty of recognition.

7. A non-transitory machine-readable storage medium having encoded thereon machine-executable instructions that, when executed by a digital processing unit, causes the digital processing unit to perform the method of claim 1.

8. The method of claim 1, further comprising operating a speech recognition system to carry out a speech interaction with a user, wherein operating the speech recognition system comprises operating the at least one processor to perform the semantic interpreting, the determining, and the comparing.

9. The method of claim 1, wherein adjusting the first threshold based at least in part on the number of times the at least one first spoken dialog hypothesis was previously output by the semantic interpreter comprises applying an optimization algorithm to adjust the first threshold based at least in part on one or more indications of whether, when one of the at least one first spoken dialog hypothesis was output in each of the number of times, it was determined that the one of the at least one first spoken dialog hypothesis was a correct interpretation of input to the semantic interpreter.

10. The method of claim 1, wherein adjusting the first threshold based at least in part on a number of times the at least one first spoken dialog hypothesis was previously output by the semantic interpreter comprises adjusting the first threshold in indirect proportion to the number of times the at least one first spoken dialog hypothesis was previously output by the semantic interpreter.

11. The method of claim 10, wherein adjusting the first threshold in proportion to the number of times the at least one first spoken dialog hypothesis was previously output by the semantic interpreter comprises adjusting the first threshold in indirect proportion to the number of times the at least one first spoken dialog hypothesis was, when previously output, determined to be a correct interpretation of input to the semantic interpreter.

12. A system for spoken dialog confirmation, comprising:
at least one processor programmed to act as:
- a spoken dialog hypothesis classifier that classifies a plurality of hypotheses into a plurality of classes of spoken dialog hypotheses, each of the plurality of spoken dialog hypotheses being a potential semantic interpretation that a semantic interpreter is able to output as a result of a semantic interpretation process performed on an input, the plurality of classes comprising a first class of spoken dialog hypotheses comprising at least one first spoken dialog hypothesis and a second class of spoken dialog hypotheses comprising at least one second spoken dialog hypothesis, the at least one first spoken dialog hypothesis being different from the at least one second spoken dialog hypothesis; and
- a threshold assigner that determines, for each of said plurality of classes of spoken dialog hypotheses, a threshold for use in evaluating a confidence level of the semantic interpreter in an output of the semantic interpreter that comprises one of the one or more hypotheses in the class, wherein the threshold assigner determines a first threshold for the first class and a second threshold for the second class, the first threshold having a different value than the second threshold, wherein the determining comprises adjusting the first threshold based at least in part on a number of times the at least one first spoken dialog hypothesis was previously output by the semantic interpreter.

13. The system of claim 12, wherein the at least one processor is further programmed to act as a spoken dialog hypothesis generator that generates at least one of the plurality of spoken dialog hypotheses and a confidence value for an input from a user.

14. The system of claim 13, wherein the at least one processor is further programmed to act as a comparator that compares said confidence value to said threshold.

15. The system of claim 14, wherein said comparator outputs said spoken dialog hypothesis as an accepted spoken dialog hypothesis if said confidence value exceeds said threshold.

16. The system of claim 12, wherein said threshold assigner assigns said threshold based upon the classification by said spoken dialog hypothesis classifier.

17. The system of claim 12, wherein said spoken dialog hypothesis classifier classifies said plurality of spoken dialog hypotheses based upon a frequency of occurrence of said spoken dialog hypotheses.

18. The system of claim 17, wherein said threshold assigner determines a smaller value for the first threshold as the frequency of occurrence of one or more hypotheses in the first class increases.

19. The system of claim 17, wherein said threshold assigner determines a larger value for the first threshold as the frequency of occurrence of one or more hypotheses in the first class decreases.

20. A system for recognizing speech input provided by a user, the system comprising:
at least one processor programmed to:
for each class of a plurality of classes of spoken dialog hypotheses, determine a threshold for use in evaluating a confidence level of the semantic interpreter in an output of the semantic interpreter that comprises one of the one or more hypotheses in the class, each of the plurality of spoken dialog hypotheses being a potential semantic interpretation that a semantic interpreter is able to output as a result of a semantic interpretation process performed on an input, wherein the determining comprises determining a first threshold for a first class of spoken dialog hypotheses and a second threshold for a second class of spoken dialog hypotheses, the first threshold having a different value than the second threshold, the first class comprising at least one first spoken dialog hypothesis and the second class comprising at least one second spoken dialog hypothesis, the at least one first spoken dialog hypothesis being different from the at least one second spoken dialog hypothesis, wherein the determining comprises adjusting the first threshold based at least in part on a number of times the at least one first spoken dialog hypothesis was previously output by the semantic interpreter;

for a first input received from the user, semantically interpret the first input to determine a hypothesis for the first input, from the plurality of spoken dialog hypotheses, and a confidence value;

determine a class of the plurality of classes of spoken dialog hypotheses into which the hypothesis is classified and, based on the class, at least one threshold associated with the class for use in evaluating a confidence level of a hypothesis; and compare the confidence value for the hypothesis to the at least one threshold associated with the class of the hypothesis.

21. The system of claim 20, wherein the at least one threshold in the sets of thresholds associated with the class comprises an acceptance threshold and a rejection threshold, and wherein the at least one processor is programmed to compare the confidence value to the at least one threshold by:

accepting the speech recognition hypothesis when the confidence value exceeds the acceptance threshold;

rejecting the speech recognition hypothesis when the confidence value does not exceed the rejection threshold; and prompting the user regarding the spoken dialog hypothesis when the confidence value exceeds the rejection threshold but does not exceed the confirmation threshold.

* * * * *